(12) United States Patent
Nguyen et al.

(10) Patent No.: US 6,519,620 B1
(45) Date of Patent: Feb. 11, 2003

(54) SATURATION SELECT APPARATUS AND METHOD THEREFOR

(75) Inventors: Huy Van Nguyen, Round Rock, TX (US); Michael Putrino, Austin, TX (US); Charles Philip Roth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,877

(22) Filed: Apr. 22, 1999

(51) Int. Cl.[7] .............................. G06F 7/38; G06F 11/00
(52) U.S. Cl. ........................................ 708/552; 708/530
(58) Field of Search .............................. 708/530, 552, 708/498, 207; 340/146.2

(56) References Cited

U.S. PATENT DOCUMENTS

| | | | | |
|---|---|---|---|---|
| 4,760,374 A | * | 7/1988 | Moller ........................ | 708/207 |
| 4,774,688 A | * | 9/1988 | Kobayashi et al. ......... | 708/207 |
| 5,369,438 A | * | 11/1994 | Kim ........................... | 708/552 |
| 5,448,509 A | * | 9/1995 | Lee et al. .................... | 708/530 |
| 5,469,376 A | * | 11/1995 | Abdallah .................... | 708/207 |
| 5,677,860 A | * | 10/1997 | Yazawa et al. ............. | 708/530 |
| 5,847,978 A | * | 12/1998 | Ogura et al. ................ | 708/552 |

* cited by examiner

*Primary Examiner*—Tan V. Mai
(74) *Attorney, Agent, or Firm*—Winstead Sechrest & Minick P.C.; Barry S. Newberger; Jeffrey S. LaBaw

(57) ABSTRACT

A saturation select apparatus and method are implemented. Late stage logic blocks in an adder are provided which combine saturation select control signals with sum generating signals. A first saturation select control is asserted in response to an unsigned saturated instruction, and a second saturation select control is asserted in response to a signed saturated instruction. If either select control is asserted, each logic block outputs a corresponding bit of a respective saturation value. In response to a modulo mode instruction, both select control signals are negated, and each logic block outputs a corresponding bit of the arithmetic operation (sum or difference) implemented by the instruction.

22 Claims, 5 Drawing Sheets

SATURATION SELECT APPARATUS AND METHOD THEREFOR

CROSS REFERENCE TO RELATED APPLICATION

The present invention is related to U.S. patent application Ser. No. 09/315,545 entitled "SATURATION DETECTION APPARATUS AND METHOD THEREFOR," which is hereby incorporated herein by reference.

TECHNICAL FIELD

The present invention relates in general to data processing systems, and in particular, to vector arithmetic operations in a data processor.

BACKGROUND INFORMATION

Vector processing extensions to microprocessor architectures are being implemented to enhance microprocessor performance, particularly with respect to multimedia applications. One such vector processing extension is the Vector Multimedia Extension (VMX) to the PowerPC microprocessor architecture ("PowerPC" is a trademark of IBM Corporation.) VMX is a single instruction multiple data (SIMD) architecture. In a SIMD architecture, a single instruction operates on multiple sets of operands. For example, an instruction having thirty-two bit operands may operate on the operands in bytewise fashion as four eight-bit operands, as sixteen bit half-word operands, or as word length operands of thirty-two bits.

Integer arithmetic instructions may have both modulo, that is, wrap around, and saturating modes. The mode determines the result of the operation implemented by the instruction when the result overflows the result field, either a byte-length field, a half-word-length field, or a word length field, depending on the data type being operated on by the instruction. In modulo mode, the result truncates an overflow or underflow for the length (byte, half-word, or word) and type of operand (signed or unsigned). In saturating mode, the result is clamped to its saturated value, the smallest or largest representable value in the field.

To implement these instructions, three tasks need to be performed. An intermediate result is produced, using a single adder, in accordance with the specific instruction being executed. It is then determined if the intermediate result fits into the field corresponding to the length of the operand. Then, the appropriate result must be selected, either the intermediate result, the truncated overflow or underflow, if in modulous mode, or the saturation value, if in saturating mode.

The task of determining if an intermediate result fits into its field, and the task of selecting the appropriate value as a final result may be complicated and time consuming. In particular, these tasks are complicated in that the instructions support different data types, that is, instruction operands having different lengths, as described hereinabove, each of which may be either signed or unsigned. Consequently, it becomes difficult to meet cycle time requirements if the three tasks are performed sequentially.

Thus, there is a need in the art for apparatus and methods for implementing vector integer arithmetic instructions, which are sufficiently fast to meet cycle time requirements. In particular, there is a need in the art for performing, in parallel, the tasks of generating an intermediate result, determining if the intermediate results fits into a preselected field, and selecting a mode dependent result value.

SUMMARY OF THE INVENTION

The aforementioned needs are addressed by the present invention. Accordingly, there is provided, in a first form, a saturation select apparatus. The apparatus includes a plurality of logic circuits, in which each circuit of said plurality is operable for outputting a corresponding bit of an n-bit result signal. Each logic circuit outputs said corresponding bit in response to first and second input signals, and first and second control signals, wherein said first control signal is asserted in response to a first saturated instruction, and said second control signal is asserted in response to a second saturated instruction.

There is also provided, in a second form, a data processing system. The system includes a central processing unit (CPU), and a memory operable for communicating instructions and operand data to said CPU. The CPU includes an execution unit operable for executing said instructions, in which the execution unit contains saturation select circuitry including a plurality of logic circuits. Each circuit of said plurality is operable for outputting a corresponding bit of an n-bit result signal, wherein each logic circuit outputs said corresponding bit in response to first and second input signals, and first and second control signals. The first and second input signals are generated in response to said operand data. The first control signal is asserted in response to a first saturated instruction, and said second control signal is asserted in response to a second saturated instruction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
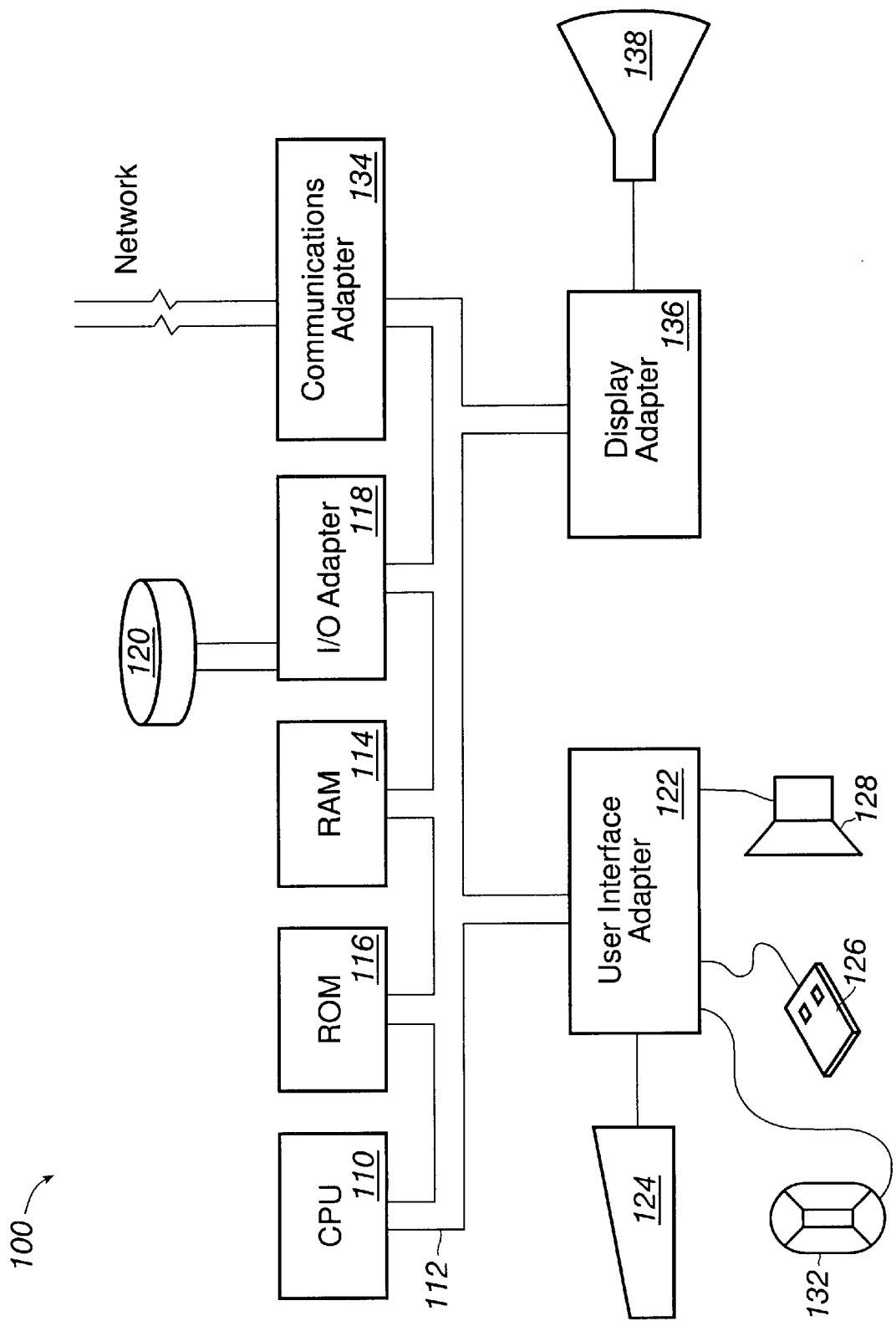
FIG. 1 illustrates, in block diagram form, a data processing system in accordance with an embodiment of the present invention.

A saturation mechanism is provided. Saturation selection is incorporated in final stages of an adder performing the vector sum operations. The adder outputs either the sum result, or a preselected saturation value, in response to saturation control signals received from a saturation detection mechanism. Saturation detection mechanisms which may be used in the present invention are described in the commonly-owned, co-pending U.S. patent application Ser. No. 09/315,545 entitled "Saturation Detection Apparatus and Method Therefor," incorporated herein by reference.

In the following description, numerous specific details, such as, specific operand lengths, are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. Data processing system 100 includes random access memory (RAM) 114, read only memory (ROM) 116, and input/output (I/O) adapter 118 for connecting peripheral devices such as disk units 120 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
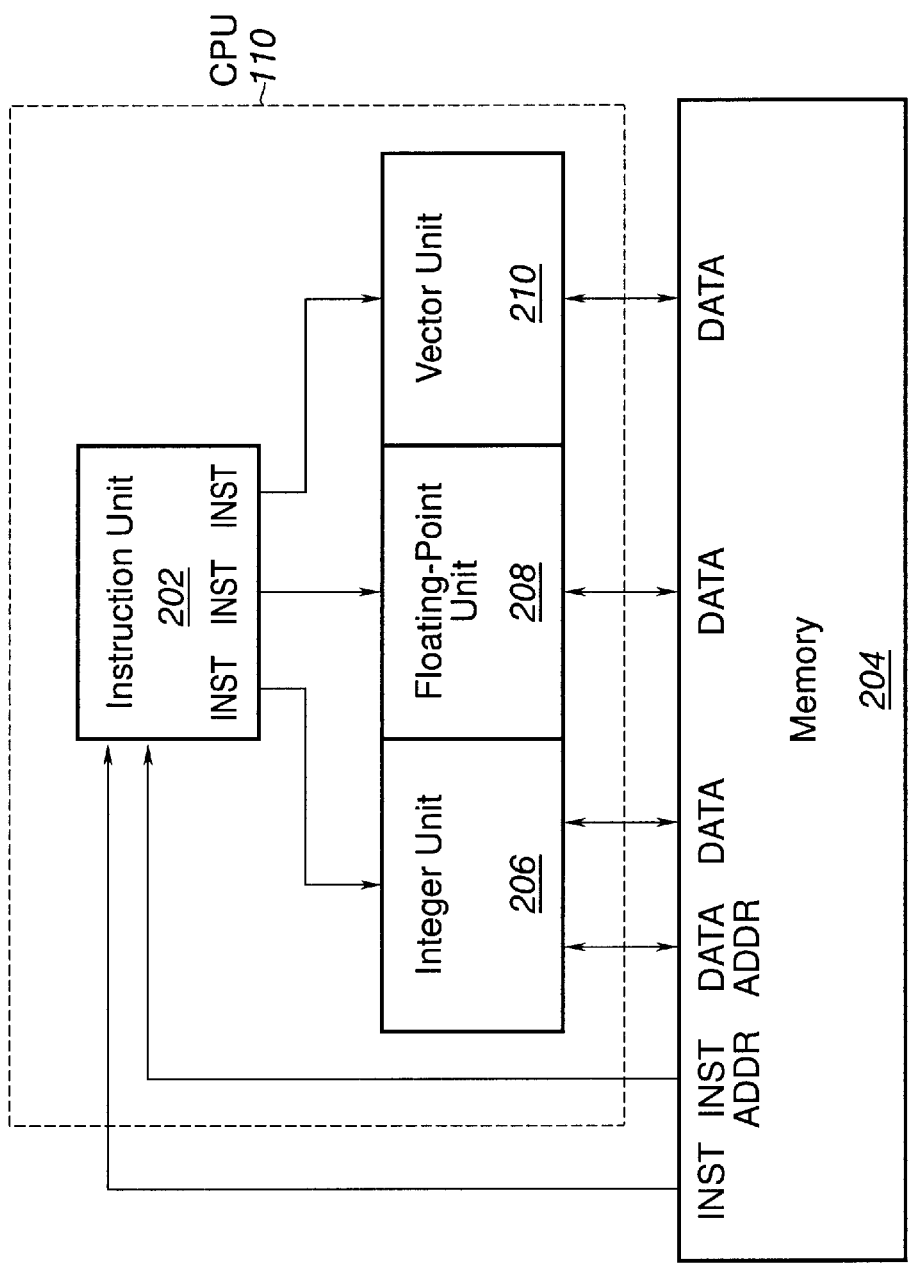
FIG. 2 illustrates, in block diagram form, a central processing unit in accordance with an embodiment of the present invention.

Refer now to FIG. 2 illustrating CPU 110 in further detail. CPU 110 includes instruction unit 202 that receives instructions passed from memory 204. Instruction unit 202 partially decodes the instructions and queues them for issuance to the appropriate one of integer unit 206, floating point unit 208 and vector unit 210. Integer unit 206, floating point unit 208 and vector unit 210 execute the instructions, and perform integer operations, floating point operations and vector operations, respectively. Saturation detection in vector fixed point operations, in accordance with an embodiment of the present invention, may be included in vector unit 210.

Figure 3:
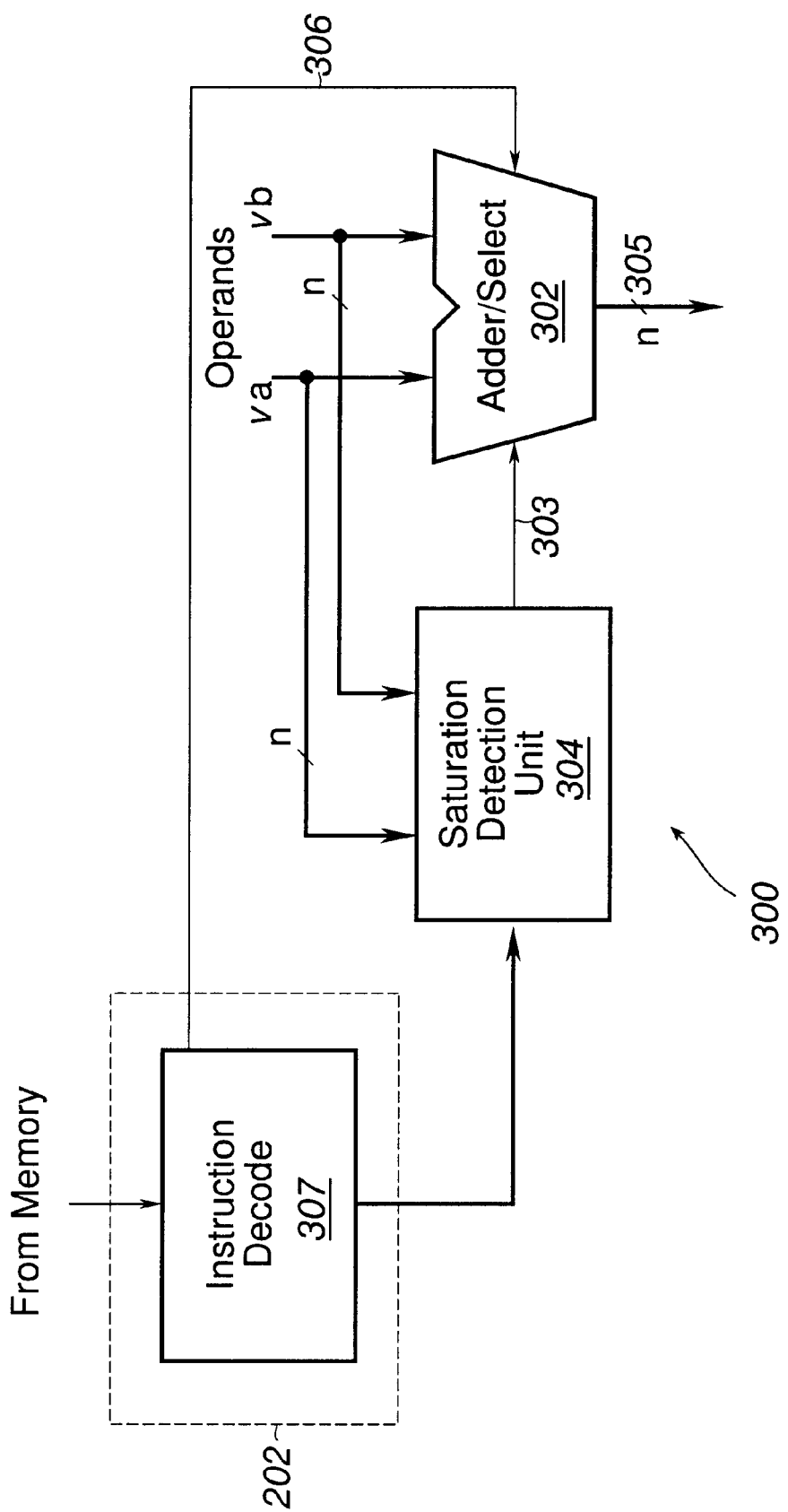
FIG. 3 illustrates, in schematic form, a saturation select mechanism in accordance with an embodiment of the present invention.

Refer now to FIG. 3 illustrating saturation select mechanism 300 in accordance with the present invention. Saturation selection mechanism 300 includes adder/select unit 302 and saturation detection unit 304. A saturation detection unit which may be used in saturation select apparatus 300 is described in the co-pending, commonly-owned U.S. patent application Ser. No. 09/315,545 entitled "Saturation Detection Apparatus and Method Therefor," incorporated herein by reference. Saturation Detection Unit 304 outputs saturation control select signals 303 to adder/select unit 302. Adder/select unit 302 outputs n-bit result signal 305. Result signal 305 represents a sum or difference of n-bit input operands, or a preselected saturation value, according to control signals 303.

Adder/select unit 302 outputs preselected saturation values in response to saturation control signals 303. If the saturation control signals 303 are negated, the sum or difference result is output. The sum or differences output in response to instruction information signals 306 received from instruction decode unit 307. If, however, one of saturation control signals 303 is asserted, a corresponding preselected saturation value is output in result signal 305. Depending on the instruction being executed, the end-bit instruction operands may represent a portion of a vector operand, in which case the arithmetic operation being performed by the executing instruction represents corresponding operations on a plurality of portions in parallel, or alternatively, maybe an operation on the full vector operand. The structure of vector operands is described in the commonly-owned co-pending U.S. patent application Ser. No. 09/315,545 entitled "Saturation Detection Apparatus and Method Therefor," incorporated herein by reference. It would be understood by an artisan of ordinary skill that the principle of operation of saturation select mechanism 300, according to the present invention, is the same in either case.

Figure 4:
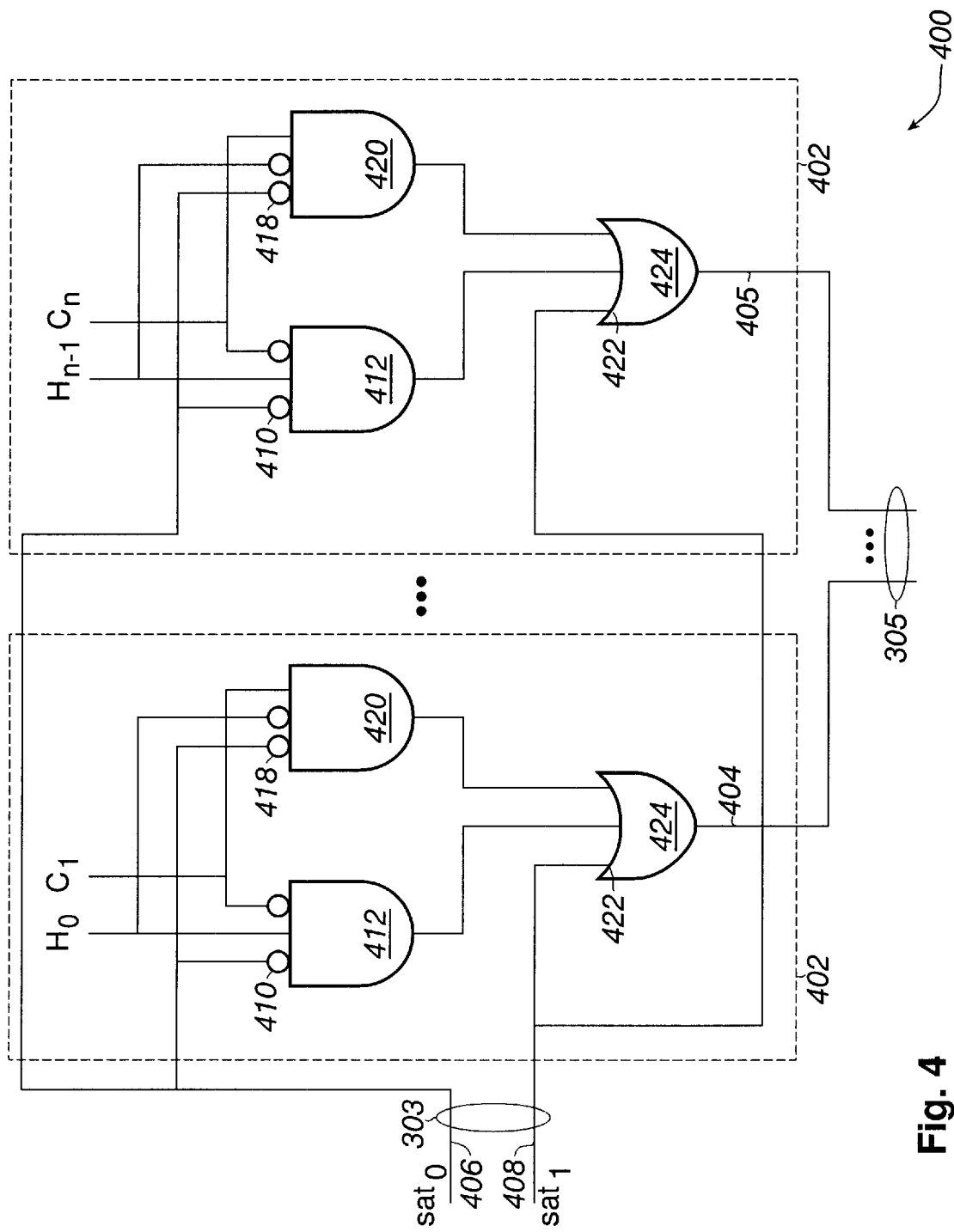
FIG. 4 illustrates a portion of the saturation select mechanism of FIG. 3.
Figure 5:
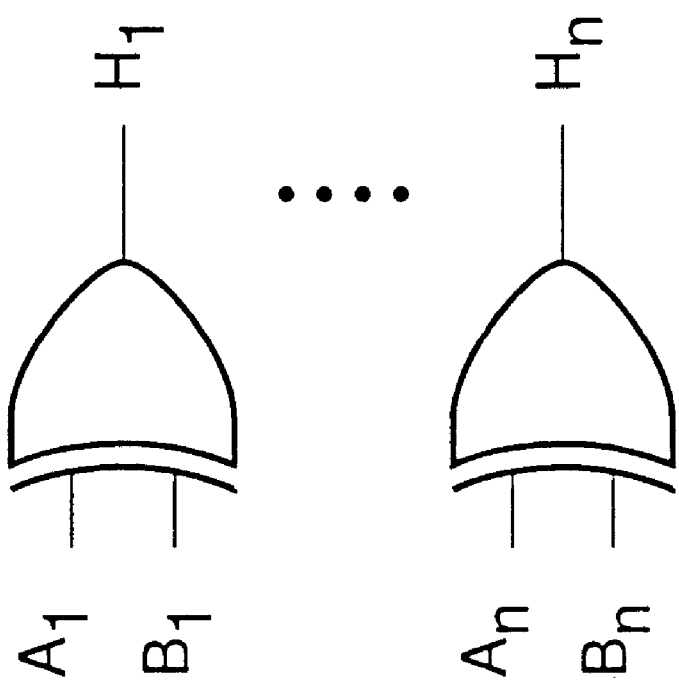
FIG. 5 illustrates an embodiment of the present invention of exclusive-OR (XOR) gates.

Refer now to FIG. 4 illustrating portion 400 of adder/select unit 302. Portion 400 includes n last stage units 402. Each of units 402 output one of result signals 404, . . . , 405 included in result 305.

Saturation control signals 303 include a first saturation control signal, $sat_0$, 406, and a second saturation control signal, $sat_1$, 408. Control signal 406 is coupled to inverting input 410 of gates 412. Control signal 406 is also provided to inverting input 418 of gages 420. Control signal 408 is provided to inputs 422 of gates 424. Control signals 406, $sat_0$, and 408, $sat_1$, may be simultaneously negated, but may not be simultaneously asserted. Saturation detection unit 304 negates control signals 406 and 408 when the executing instruction is a modulo mode instruction, in accordance with the principals described in the commonly-owned co-pending U.S. Patent Application entitled "Saturation Detection Apparatus and Method Therefor," incorporated herein by reference.

Sum signals $S_0, S_1, \ldots, S_{n-2}, S_{n-1}$ are generated by a corresponding one of units 402 in response to signals $H_0, \ldots, H_{n-2}, H_{n-1}$, and carry-in signals $C_1, \ldots, C_{n-1}, C_n$ when control signals 406 and 408 are negated. These are output by the corresponding one of final stages 402 on outputs 404, . . . , 405 forming result 305. Signals $H_0, \ldots, H_{n-1}$ and carry-in signals $C_1, \ldots, C_n$ are generated in accordance with the following Equation (1):

$$S_i = H_i \oplus C_{i+1},$$

and $$H_i = A_i \oplus B_i, i=0, 2, \ldots, n-1,$$

where $$C_i = G_{(i+1:n)} + P_{(i+1:n)} \cdot C_n, i=1, 2, \ldots, n-1;$$

$$G_{(k:n)} = G_k + P_k \cdot G_{k+1} + P_{(k:k+1)} \cdot G_{k+2} + \ldots + P_{(k:n-1)} \cdot G_n, k=1, 2, \ldots, n;$$

$$P_{(i:j)} = P_i \cdot P_{i+1}, \ldots, \cdot P_j, i \leq j; =0, i>j, i, j=1, 2, \ldots, n;$$

$$G_i = A_i \cdot B_i, i=1, 2, \ldots, n;$$

and $$P_i = A_i + B_i, i=1, 2, \ldots, n. \tag{1}$$

Here the "+" denotes logical OR, the "·" denotes logical AND, and "⊕" denotes logical exclusive -OR. In the above notation, the "zeroith" bit represents a most significant bit (MSB), and the n-1st bit represents a least significant bit (LSB). The carry-in bit $C_n$ is determined by the instruction being executed. For a vector add $C_n$ may be zero, and for a vector subtract, $C_n$ may be one. In an embodiment of the present invention, carry-forward adder logic may be used to generate the signals $H_i$, $C_{i-1}$, in accordance with Equation (1).

When either control signal 406 or 408 is asserted, a saturation value is output by each of stages 402 to form result 305. Only one of signals 406 and 408 is asserted at the same time. Asserting $sat_0$, signal 406, outputs the value "0" at each of outputs 404, . . . , 405. Likewise, if $sat_1$, signal 408, is asserted, signaling saturation in a saturation mode instruction in which the saturation value includes n bits having the value "1", each of the stages 402 outputs the value "1" on the corresponding one of outputs 404, . . . , 405, to form result 305. Signals 406 and 408 may be derived from select signals in accordance with the principals of the saturation detection mechanism described in the commonly-owned, co-pending U.S. Patent Application entitled "Saturation Detection Apparatus and Method Therefor," incorporated herein by reference.

In this way, a mechanism for generating saturated sums and differences is provided. Saturation control signals are received and logically combined with the sum generating signals in the arithmetic unit generating the summation result. In response to the saturation control signals, the arithmetic unit outputs either the summation result, the saturation value corresponding to unsigned integer arithmetic, and a second saturation value, corresponding to signed integer arithmetic.

Although the present invention and its advantages have been described in detail, it should be understood that various changes, substitutions and alterations can be made herein without departing from the spirit and scope of the invention as defined by the appended claims.

What is claimed is:

1. A saturation select apparatus comprising:
    circuitry for receiving first and second input signals; and
    a plurality of logic circuits, each circuit of said plurality operable for outputting a corresponding bit of an n-bit result signal, wherein each logic circuit outputs said corresponding bit in response to said first and second input signals, and first and second control signals, and wherein said first control signal is asserted in response to a first saturated instruction, and said second control signal is asserted in response to a second saturated instruction.

2. The apparatus of claim 1 wherein said first input signal comprises a carry-in bit, and said second input signal comprises an exclusive-OR (XOR) of a corresponding bit of first and second source operands.

3. The apparatus of claim 1 wherein said first and second input signals are logically combined to generate a third signal and a fourth signal, said corresponding bit being output in response to said third and fourth signals, and said first and second control signals.

4. The apparatus of claim 3 wherein said third signal comprises a logical AND of said first signal and a complement of said second signal, and wherein said fourth signal comprises a logical AND of a complement of said first signal and said second signal.

5. The apparatus of claim 4 wherein said corresponding bit is output in response to fifth and sixth signals comprising a logical AND of a complement of said first control signal and said third and fourth signals, respectively, and said second control signal.

6. The apparatus of claim 5 wherein said corresponding bit comprises a logical OR of said fifth and sixth signals, and said second control signal.

7. The apparatus of claim 3 further comprising:
    a first AND gate, said first AND gate having a first input operable for receiving said first signal and a second, inverting, input operable for receiving said second signal, wherein said first AND gate outputs said third signal; and
    a second AND gate, said second AND gate having a first, inverting, input operable for receiving said first signal and a second input operable for receiving said second signal, wherein said second AND gate outputs said fourth signal.

8. The apparatus of claim 6 wherein said first AND gate further includes a third, inverting, input operable for receiving said first control signal, an output of said first AND gate outputting a logical AND of said third signal and a complement of said first control signal, and wherein said second AND gate further includes a third, inverting, input operable for receiving said first control signal, an output of said second AND gate outputting a logical AND of said fourth signal and a complement of said first control signal.

9. The apparatus of claim 8 further comprising an OR gate having a first input operable for receiving said second control signal, a second input operable for receiving said output of said first AND gate and a third input operable for receiving said output of said second AND gate, said OR gate outputting said result signal.

10. A data processing system comprising:
    a central processing unit (CPU);
    a memory operable for communicating instructions and operand data to said CPU, said CPU comprising:
        an execution unit operable for executing said instructions, said execution unit containing saturation select circuitry including a plurality of logic circuits, each circuit of said plurality operable for outputting a corresponding bit of an n-bit result signal, wherein each logic circuit outputs said corresponding bit in response to first and second input signals, and first and second control signals, and wherein said first control signal is asserted in response to a first saturated instruction, and said second control signal is asserted in response to a second saturated instruction, and wherein said first and second input signals are generated in response to said operand data.

11. The data processing system of claim 10 wherein said operand data comprises first and second source operands of a preselected one of said instructions, and wherein said first input comprises a carry-in bit generated in response to said first and second source operands.

12. The data processing system of claim 11 wherein said second input comprises an exclusive-OR of a corresponding bit of said first and second source operands.

13. The data processing system of claim 10 wherein said first and second input signals are logically combined to generate a third signal and a fourth signal, said corresponding bit being output in response to said third and fourth signals, and said first and second control signals.

14. The data processing system of claim 13 wherein said third signal comprises a logical AND of said first signal and a complement of said second signal, and wherein said fourth signal comprises a logical AND of a complement of said first signal and said second signal.

15. The data processing system of claim 14 wherein said corresponding bit is output in response to fifth and sixth signals comprising a logical AND of a complement of said first control signal and said third and fourth signals, respectively, and said second control signal.

16. The data processing system of claim 15 wherein said corresponding bit comprises a logical OR of said fifth and sixth signals, and said second control signal.

17. The data processing system of claim 13 wherein said execution unit comprises:

a first AND gate, said first AND gate having a first input operable for receiving said first signal and a second, inverting, input operable for receiving said second signal, wherein said first AND gate outputs said third signal;

a second AND gate, said second AND gate having a first, inverting, input operable for receiving said first signal and a second input operable for receiving said second signal, wherein said second AND gate outputs said fourth signal, wherein said first AND gate further includes a third, inverting, input operable for receiving said first control signal, an output of said first AND gate outputting a logical AND of said third signal and a complement of said first control signal, and wherein said second AND gate further includes a third, inverting, input operable for receiving said first control signal, an output of said second AND gate outputting a logical AND of said fourth signal and a complement of said first control signal; and an OR gate having a first input operable for receiving said second control signal, a second input operable for receiving said output of said first AND gate and a third input operable for receiving said output of said second AND gate, said OR gate outputting said result signal.

18. A saturation select method comprising the step of generating a plurality of bits of a result signal, wherein a generation of each bit comprises:

logically combining first and second input signals, and a first control signal to generate third signal and fourth signals, said third and fourth signals being operable for combining with a second control signal to generate said bit, wherein said first control signal is asserted in response to a first saturated instruction, and said second control signal is asserted in response to a second saturated instruction.

19. The method of claim 18 wherein said step of logically combining to form said third signal comprises the steps of:

ANDing said first input signal with a complement of said second input signal and a complement of said first control signal.

20. the method of claim 18 wherein said logically combining to form said fourth signal comprises the steps of:

ANDing said second input signal with a complement of said first input signal and a complement of said first control signal.

21. The method of claim 18 further comprising the step of logically combining said third and fourth signals and said second control signal to generate said bit.

22. The method of claim 21 wherein said step of logically combining said third and fourth signals comprises the step of ORing said third and fourth signals and said second control signal.

* * * * *

UNITED STATES PATENT AND TRADEMARK OFFICE
CERTIFICATE OF CORRECTION

PATENT NO.    : 6,519,620 B1
DATED         : February 11, 2003
INVENTOR(S)   : Huy Van Nguyen, Michael Putrino and Charles Philip Roth It is certified that error appears in the above-identified patent and that said Letters Patent is hereby corrected as shown below:

<u>Column 4,</u>
Line 57, please move the following to its own separate line
"= 0, i>j, i, j = 1, 2, ..., n;".

<u>Column 6,</u>
Line 18, please replace "6" with -- 7 --.

Signed and Sealed this

Sixth Day of January, 2004

JAMES E. ROGAN
*Director of the United States Patent and Trademark Office*